(12) United States Patent
Naito

(10) Patent No.: US 6,728,226 B1
(45) Date of Patent: Apr. 27, 2004

(54) MULTICAST MESSAGE COMMUNICATING METHOD, MULTICAST MESSAGE COMMUNICATING SYSTEM, BASE STATION THEREOF, AND MOBILE STATION THEREOF

(75) Inventor: Kosuke Naito, Tokyo (JP)

(73) Assignee: NEC Corporation, Tokyo (JP)

( * ) Notice: Subject to any disclaimer, the term of this patent is extended or adjusted under 35 U.S.C. 154(b) by 848 days.

(21) Appl. No.: 09/598,011

(22) Filed: Jun. 20, 2000

(30) Foreign Application Priority Data

Jun. 22, 1999 (JP) .......................................... 11-175685

(51) Int. Cl.[7] .............................................. H04Q 7/00
(52) U.S. Cl. ...................................... 370/328; 455/522
(58) Field of Search ............................... 370/331, 395.1, 370/328, 342, 312; 455/555, 24, 504, 505, 506, 522, 69, 503, 127.1, 101

(56) References Cited

U.S. PATENT DOCUMENTS

| | | | | |
|---|---|---|---|---|
| 5,551,057 A | * | 8/1996 | Mitra ......................... | 455/522 |
| 5,761,619 A | * | 6/1998 | Danne et al. ............. | 455/422.1 |
| 5,887,252 A | * | 3/1999 | Noneman ................... | 455/463 |
| 6,072,784 A | * | 6/2000 | Agrawal et al. ........... | 370/311 |
| 6,259,683 B1 | * | 7/2001 | Sekine et al. .............. | 370/328 |
| 6,370,127 B1 | * | 4/2002 | Daraiseh et al. ........... | 370/328 |
| 6,424,638 B1 | * | 7/2002 | Ray et al. ................... | 370/331 |
| 6,539,237 B1 | * | 3/2003 | Sayers et al. ............... | 455/555 |
| 6,574,221 B1 | * | 6/2003 | Petersen ................... | 370/395.1 |

FOREIGN PATENT DOCUMENTS

| | | |
|---|---|---|
| JP | 7336292 | 6/1994 |
| JP | 8032513 | 2/1996 |
| JP | 8032514 | 2/1996 |
| JP | 9275373 | 10/1997 |
| JP | 10224293 | 8/1998 |
| JP | 2000138632 | 5/2000 |

* cited by examiner

Primary Examiner—Wellington Chin
Assistant Examiner—Jamal A. Fox
(74) Attorney, Agent, or Firm—Dickstein, Shapiro, Morin & Oshinsky, LLP.

(57) ABSTRACT

A multicast message communicating system is disclosed, that comprises a base station for transmitting a multicast message using a multicast channel, and a plurality of mobile stations for receiving the multicast message from the base station, wherein the base station has a receiving portion for receiving transmission power increase request signals from the plurality of mobile stations corresponding to reception powers of the multicast message received from the plurality of mobile stations, a reception power detecting portion for detecting the reception powers of the transmission power increase request signals received from the receiving portion, a transmission power control generating means for deciding and generating a transmission power increase request signal or a transmission power decrease request signal for the plurality of mobile stations corresponding to the received powers.

20 Claims, 6 Drawing Sheets

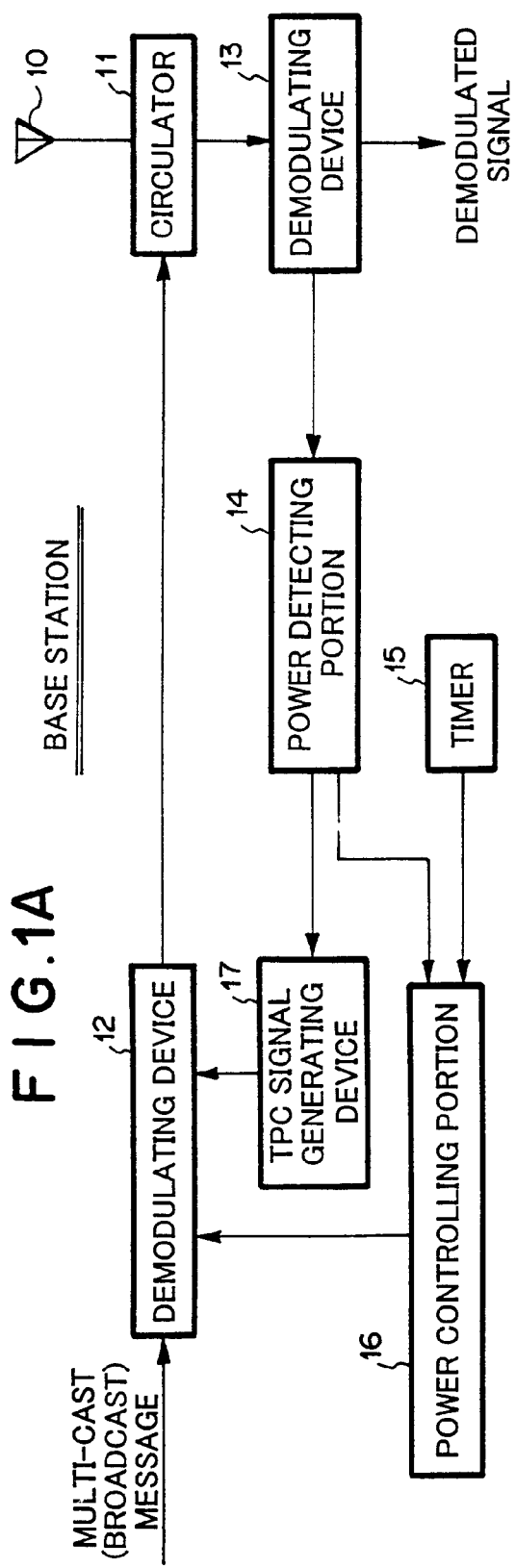
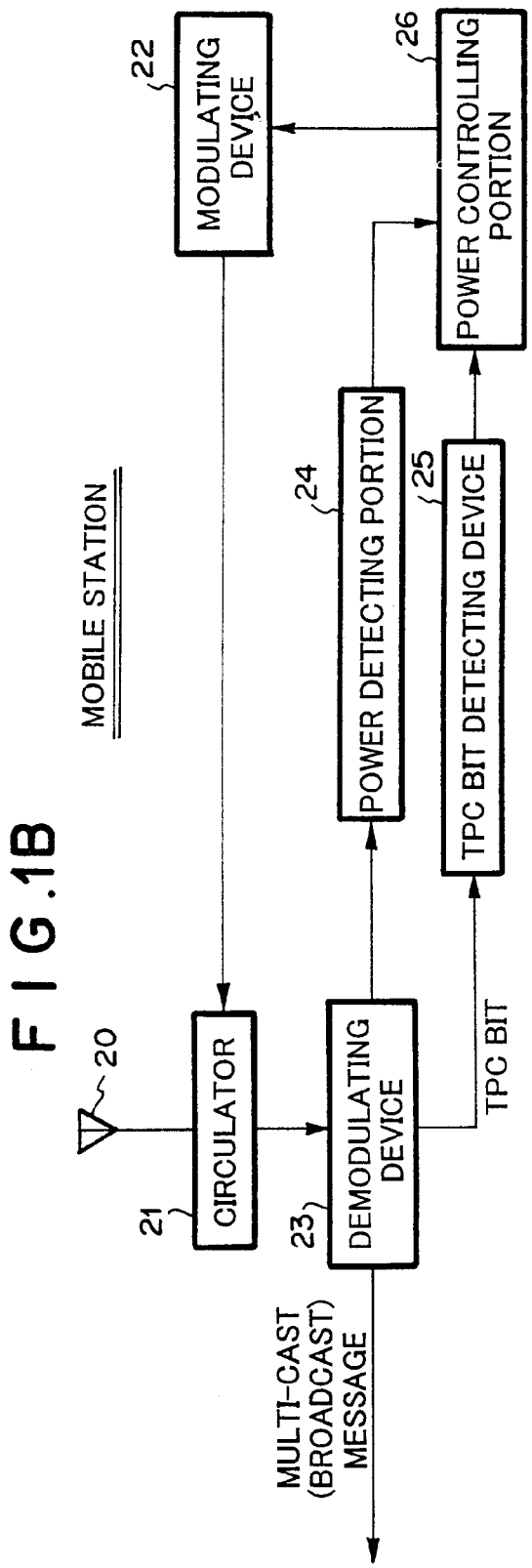
FIG.1A
FIG.1B

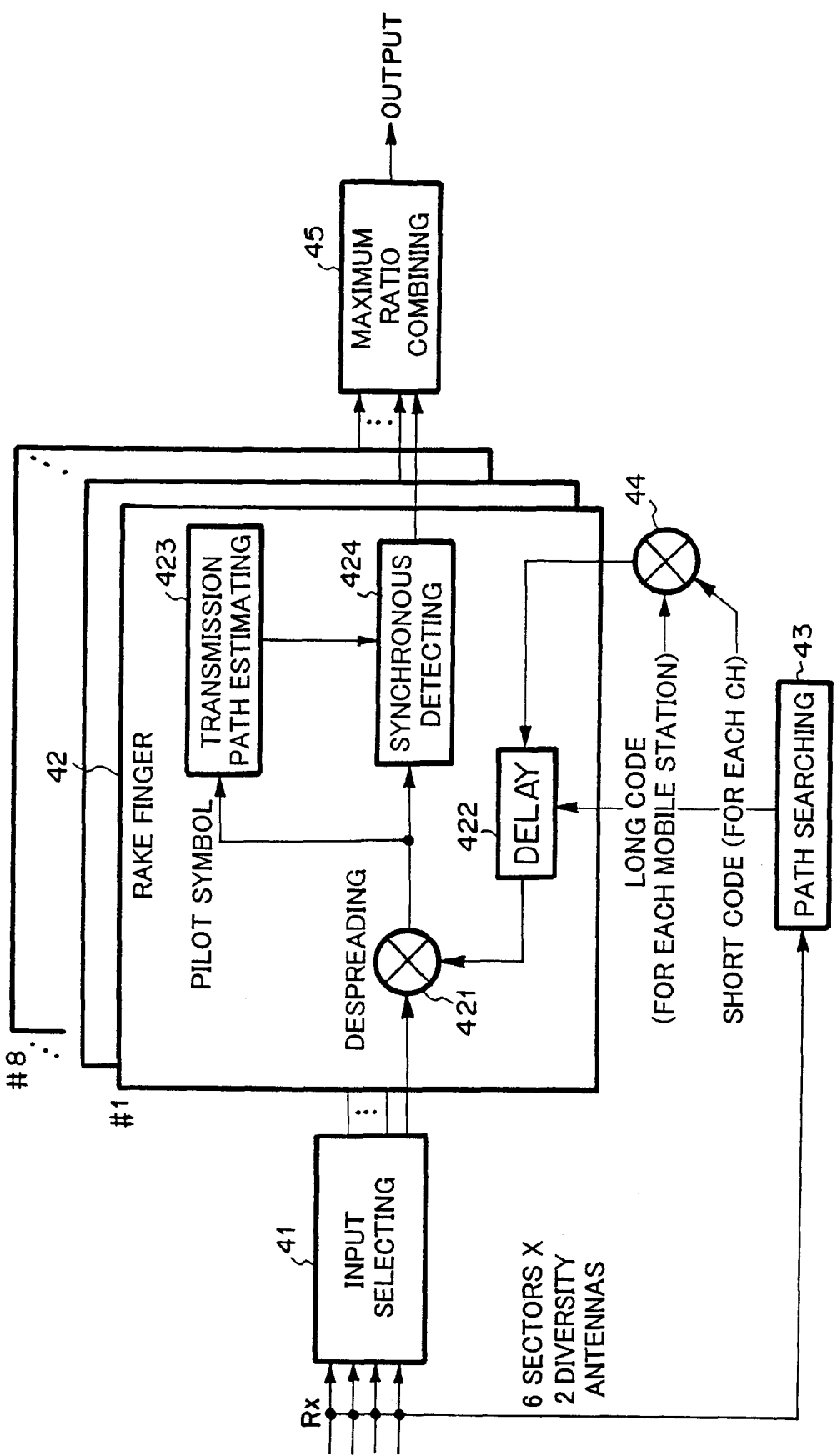

MULTICAST MESSAGE COMMUNICATING METHOD, MULTICAST MESSAGE COMMUNICATING SYSTEM, BASE STATION THEREOF, AND MOBILE STATION THEREOF

BACKGROUND OF THE INVENTION

1. Field of the Invention

The present invention relates to a multicast message communicating system, a multicast message communicating apparatus, a base station apparatus, and mobile stations for use with a mobile communicating system for controlling transmission powers of the mobile station and the base station in the case that the base station transmits a multicast message to the mobile stations using a multicast channel.

2. Description of the Related Art

There are many methods for optimizing transmission powers of a base station and a plurality of mobile stations for use with mobile communicating systems. In particular, in the DS-CDMA system of which a plurality of channels is transmitted and received with one frequency band, a plurality of cells may be adjacently disposed. Thus, it is necessary to prevent one cell from interfering with other cells. In addition, to stably transmit and receive signals between a base station and mobile stations in the local cell, it is necessary to optimize not only a transmission power from the base station to the mobile stations and transmission powers of the mobile stations to the base station.

For example, Japanese Patent Laid-Open Publication No. 7-336292 discloses a method for maintaining a sufficient transmission quality over a communication link. This method comprises the steps of (a) calculating the gain of a signal path between a transmitting device and a receiving station, (b) measuring the level of the interference power of a common communication path of the receiving station, (c) calculating the product of the reciprocal of the gain of the signal path, the level of the interference power of the common communication path, and a predetermined value corresponding to the minimum target value of the ratio of the received carrier power and the common communication interface power, (d) adjusting the power of a signal transmitted by the transmitting device corresponding to the product, and (e) repeating the steps (a) to (e) by varying a time interval of the step (d). Thus, the necessity of the coincidence and the linkage of a plurality of transmitting devices can be alleviated. Thus, the cost of the transmission power controlling process can be reduced.

As another related art reference, Japanese Patent Laid-Open Publication No. 8-32513 discloses a transmission power controlling method for a spread spectrum communicating apparatus. This method comprising the steps of (a) storing a predetermined transmission power control amount corresponding to the number of reception times of the same value of a transmission power control bit that is transmitted from a receiving station to a transmitting station, the predetermined transmission power control amount being stored to the transmitting station, (b) successively transmitting the transmission power control bit from the receiving station to the transmitting station, (c) detecting the number of reception times of the same value of the transmission power control bit transmitted from the receiving station, the number of reception times being detected by the transmitting station, and (d) controlling the transmission power corresponding to the transmission power control amount corresponding to the number of reception times of the same value of the transmission power control bit, the transmission power being controlled by the transmitting station, wherein when the transmission power control bit of the same value is successively received, it is determined that the reception power of the remote station has been largely varied and the transmission power is largely increased or decreased as the reception time elapses, thereby compensating the abrupt fluctuation of the communication path.

As other related art references, Japanese Patent Laid-Open Publication Nos. 9-275373 (Japanese Patent No. 2803626) and Japanese Patent Laid-Open Publication No. 10-224293 disclose controlling systems and controlling methods for controlling a transmission power of a radio signal corresponding to the code division multi-access (CDMA) system. In these systems and methods, when a local station receives a transmission power increase/decrease command from a radio base station controlling device, the local station transmits a signal that represents an increase/decrease amount designated by an output increase/decrease designating means to a transmission output controlling means of the mobile station.

In conventional cellular mobile communicating systems, there are two types of channels transmitted by the base station. The first type of channels is a discrete (multicast) channel assigned to each specified user (mobile station). The second type of channels is a common (broadcast) channel with which all users receive control information. Although a common (broadcast) channel that a plurality of nonspecific users can receive and use control information has been defined, a multicast channel that a plurality of specific users can receive has not been defined. Thus, in the conventional cellular mobile communicating systems, to perform a multicast service, the same information is transmitted to individual users with discrete (multicast) channels. Alternatively, a broadcast message is transmitted to specific users with the common channel.

On the other hand, in the next generation mobile communicating systems that are being currently standardized (third and later generation systems), it is expected that such a multicast service using a multicast channel will be provided. In particular, when a CDMA cellular system using spread spectrum method is considered, it is necessary to maximally suppress a multicast message from interfering with other channels. In other words, it is preferred that the reception power of a multicast message of a mobile station is the minimally required level for a user whose reception condition is the worst in specific users who receive the multicast message.

SUMMARY OF THE INVENTION

The present invention is made from the above-described point of view. An object of the present invention is to allow the quality of a multicast message transmitted from a base station to a plurality of specific mobile stations to be improved in a short time and the power consumption necessary for controlling the transmission powers of mobile stations to be decreased.

A first aspect of the present invention is a multicast message communicating system, comprising a base station for transmitting a multicast message using a multicast channel, and a plurality of mobile stations for receiving the multicast message from the base station, wherein the base station has a receiving portion for receiving transmission power increase request signals from the plurality of mobile stations corresponding to reception powers of the multicast message received from the plurality of mobile stations, a reception power detecting portion for detecting the reception powers of the transmission power increase request signals received from the receiving portion, a transmission power control generating means for deciding and generating a transmission power increase request signal or a transmission power decrease request signal for the plurality of mobile stations corresponding to the received powers, and a power controlling portion for controlling the transmission power of the multicast message transmitted to the plurality of mobile stations corresponding to the reception powers, wherein the multicast message and the transmission power increase request signal or the transmission power decrease request signal are transmitted to the plurality of mobile stations, and wherein the plurality of mobile stations gradually decrease the transmission powers of the transmission power increase request signals corresponding to the reception powers of the transmission power increase request signal or the transmission power decrease request signal, and the multicast message received from the base station.

A second aspect of the present invention is a multicast message communicating method having a base station for transmitting a multicast message using a multicast channel and a plurality of mobile stations for receiving the multicast message from the base station, the method comprising the steps of (a) receiving transmission power increase request signals from the plurality of mobile stations corresponding to reception powers of the multicast message received from the plurality of mobile stations, (b) detecting the reception powers of the transmission power increase request signals received from the receiving portion, (c) deciding and generating a transmission power increase request signal or a transmission power decrease request signal for the plurality of mobile stations corresponding to the received powers, and (d) controlling the transmission power of the multicast message transmitted to the plurality of mobile stations corresponding to the reception powers, wherein the steps (a) to (d) are performed by the base station, wherein the multicast message and the transmission power increase request signal or the transmission power decrease request signal are transmitted to the plurality of mobile stations, and wherein the plurality of mobile stations gradually decrease the transmission powers of the transmission power increase request signals corresponding to the reception powers of the transmission power increase request signal or the transmission power decrease request signal, and the multicast message received from the base station.

A third aspect of the present invention is a base station for transmitting a multicast message to a plurality of mobile stations using a multicast channel, comprising a receiving portion for receiving transmission power increase request signals from the plurality of mobile stations corresponding to reception powers of the multicast message received from the plurality of mobile stations, a reception power detecting portion for detecting the reception powers of the transmission power increase request signals received from the receiving portion, a transmission power control generating means for deciding and generating a transmission power increase request signal or a transmission power decrease request signal for the plurality of mobile stations corresponding to the received powers, and a power controlling portion for controlling the transmission power of the multicast message transmitted to the plurality of mobile stations corresponding to the reception powers, wherein the multicast message and the transmission power increase request signal or the transmission power decrease request signal cause the transmission powers of the plurality of mobile stations to be increased or decreased, and wherein the plurality of mobile stations gradually decrease the transmission powers of the transmission power increase request signals corresponding to the reception powers of the transmission power increase request signal or the transmission power decrease request signal, and the multicast message received from the base station.

A fourth aspect of the present invention is a mobile station for receiving a multicast message from a base station using a multicast channel, comprising a receiving portion for receiving the multicast message and a transmission power increase request signal or a transmission power decrease request from the base station, a reception power detecting portion for detecting the reception power of the multicast message received from the receiving portion, and a power controlling portion for comparing the reception power with a predetermined threshold value, stopping transmitting the transmission power increase request signal to the base station when the reception power is larger than the predetermined threshold value, and increasing the transmission power of the transmission power increase request signal when the reception power is equal to or smaller than the predetermined threshold value and the receiving portion receives the transmission power decrease request signal, wherein when the power controlling portion stops transmitting the transmission power increase request signal to the base station, the power controlling portion gradually decreases the transmission power thereof.

According to the multicast message communicating system of the present invention of which a base station transmits a multicast message to a plurality of message with a particular channel, the reception powers of the mobile stations quickly converge to optimum values. In addition, the power consumption of transmission power control signals transmitted by the mobile stations can be decreased.

With reference to FIG. 1, according to the present invention, in a mobile station, a power measuring device 24 detects the reception power of a multicast message. A transmission power control signal detecting device 25 detects a transmission power control signal transmitted from a base station. Corresponding to the detected results, a transmission power controlling device 26 decides the transmission power of a transmission power increase request signal transmitted to the base station. At this point, when the reception power of the multicast message is equal to or larger than a predetermined threshold value, it is not necessary to transmit the transmission power increase request signal (the transmission power controlling device 26 decreases the transmission power of the transmission power increase request signal to 0). However, since this signal is transmitted with a common channel of all mobile stations, even if the reception power becomes equal to or larger than the predetermined threshold value, the transmission power controlling device 26 gradually decreases the transmission power. Thus, the reception power of the multicast message quickly converges to the optimum value. As a result, the power consumption of the mobile stations can be decreased.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1A is a block diagram showing the structure of a base station of a mobile communicating system according to the present invention;

FIG. 1B is a block diagram showing the structure of a mobile station of a mobile communicating system according to the present invention;

FIG. 2 is an example of the structure of a demodulating portion of the base station of the mobile communicating system according to the present invention;

DESCRIPTION OF PREFERRED EMBODIMENTS

Figure 3:
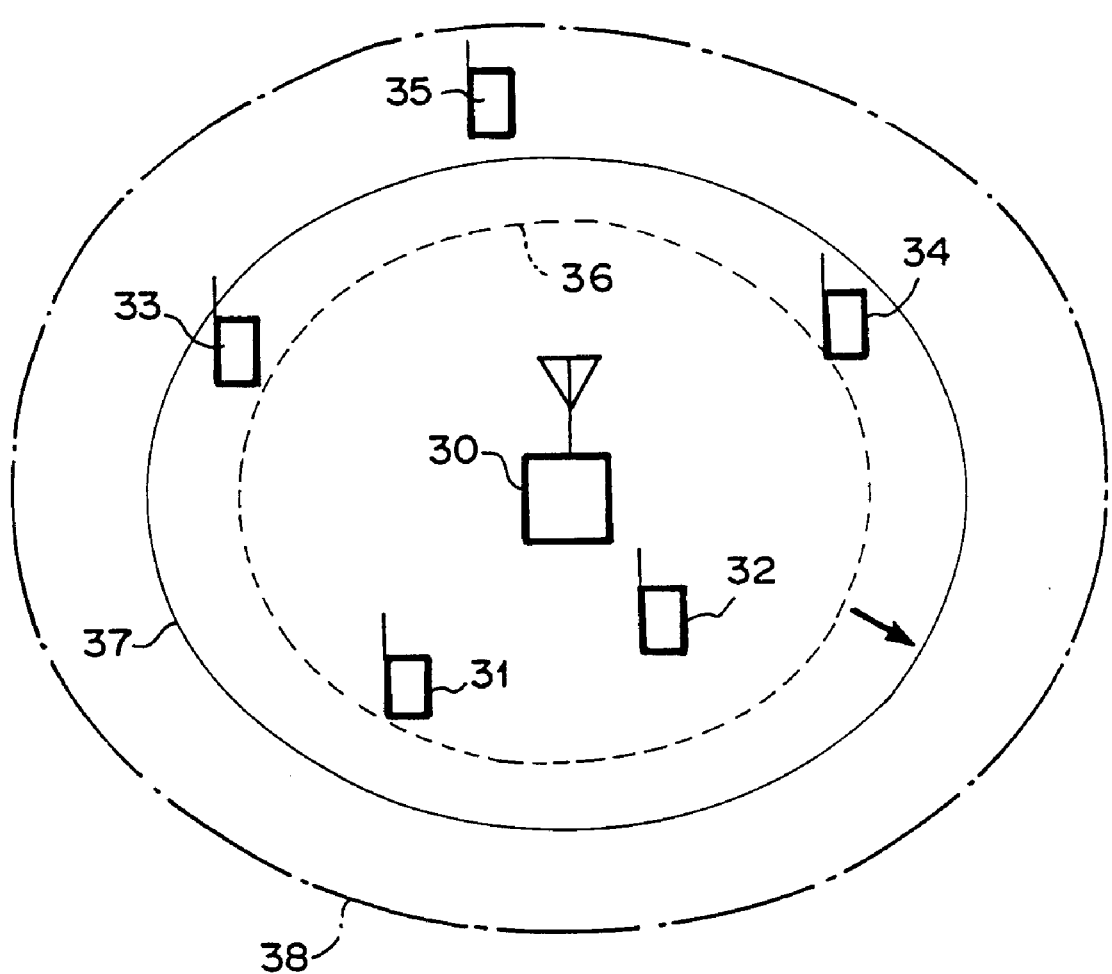
FIG. 3 is a schematic diagram for explaining the locations of the base station and the mobile stations of the mobile communicating system according to the present invention.

As related art, Japanese Patent Application No. 10-310048 (Laid-Open Publication No. 2000-138632 by Mochizuki and Furuya, Opened date: May 16, 2000) that is being filed by the assigner of this patent invention discloses a transmission power controlling method for a multicast message communicating system. In this multicast message communicating system, a plurality of specific mobile stations receive a multicast message from a base station with one communication channel. In this system, each mobile station comprises a receiving portion for receiving a multicast message, a determining device for measuring the reception power of the multicast message and determining whether or not the reception power is sufficient, a transmission power increase request signal transmitting portion for requesting the base station for an increase of the transmission power of the multicast message, a switch for causing the increase request signal for the transmission power to be turned on when the reception power of the multicast message is insufficient, and a controlling device for increasing the transmission power of the transmission power increase request signal, wherein after the transmission power increase request signal is transmitted, if the reception power of the multicast message decreases, the controlling device gradually increases the transmission power of the transmission power increase request signal.

On the other hand, the base station comprises a transmitting portion for transmitting a multicast message, a controlling device for controlling the transmission power of the multicast message transmitting device, and a receiving portion for receiving the transmission power increase request signal transmitted by the mobile station, wherein when the transmission power increase request signal is received, the controlling device increases the transmission power, when the transmission power increase request signal is not received for a predetermined time period, the controlling device gradually decreases the transmission power. Thus, the base station can transmit a multicast message to specific mobile stations with the minimum power of which a mobile station whose reception condition is the worst can receive the multicast message.

However, this related art does not mention a method of which the base station controls the transmission powers of mobile stations. When the base station does not control the transmission powers of the mobile stations, since the mobile stations do not decrease the transmission powers, the advantage of the sharing of the transmission channel is lost. In contrast, when the transmission powers of the base station are controlled, the transmission power of the transmission power increase request signal transmitted by each mobile station can be shared by all the mobile stations that receive the multicast message. Thus, from a view point of the system, the power consumption of the mobile stations can be reduced.

However, when the transmission power of the base station is controlled in the method of the above-described related art reference, if the reception power of the multicast message of a particular mobile station is a sufficient level, the particular mobile station causes the transmission of the transmission power increase request signal to stop. Thus, the reception power of the transmission power increase request signal abruptly decreases in the base station. Consequently, even if there is a mobile station that cannot receive the multicast message with a sufficient quality, the base station does not increase the transmission power of the multicast message or sometimes decrease it. As a result, the transmission time period of the transmission power increase request signals transmitted from the mobile stations becomes long. Thus, the power consumption of the mobile stations increases.

Therefore, the present invention is made from the above-described point of the related art. An object of the present invention is to allow the quality of a multicast message transmitted from a base station to a plurality of specific mobile stations to be improved in a short time and the power consumption necessary for controlling the transmission powers of mobile stations to be decreased.

Next, with reference to the accompanying drawings, embodiments of the present invention will be described in detail.

First Embodiment (1) Description of Structure

FIGS. 1A and 1B show the structures of a base station and a mobile station of a multicast message communicating system according to a first embodiment of the present invention.

In FIG. 1A, the base station comprises a modulating device 12, a circulator 11, an antenna 10, a demodulating device 13, a power detecting portion 14, a power controlling portion 16, a TPC (Transmission Power Control) signal generating device 17, and a timer 15. The modulating device 12 modulates a multicast message corresponding to the QPSK method, the QAM method, or the like. The circulator 11 separates a transmission wave from a reception wave. The antenna 10 transmits the multicast message and receives transmission power increase request signals from a plurality of mobile stations. The demodulating device 13 modulates the transmission power increase request signals received from the mobile stations. The power detecting portion 14 detects the reception powers of the transmission power increase request signals received from the mobile stations. The power controlling portion 16 controls the transmission power of a signal transmitted from the base station to the mobile stations. The TPC signal generating device 17 generates a transmission power control signal bit for controlling the transmission power of each mobile station. The timer 15 counts a time period of which the reception power of the transmission power increase request signal received from each mobile station is smaller than a predetermined threshold value.

It should be noted that the system also has the structure for transmitting and receiving discrete channels and a common channel as well as the multicast channel.

As shown in FIG. 1B, the mobile station comprises a modulating device 22, a circulator 21, an antenna 20, a demodulating device 23, a power detecting portion 24, a TPC bit detecting device 25, and a power controlling portion 26. The modulating device 22 modulates a transmission power increase request signal transmitted to the base station. The circulator 21 separates a transmission wave from a reception wave. The antenna 20 transmits the transmission power increase request signal to the base station and receives a multicast message therefrom. The demodulating device 23 demodulates the multicast message received from the base station. The power detecting portion 24 detects the reception power of the multicast message received from the base station. The TPC bit detecting device 25 detects a transmission power control (TPC) signal bit received from the base station. The power controlling portion 26 controls the reception power and the transmission power corresponding to the TPC bit.

It should be noted that each mobile station has a structure for transmitting and receiving a discrete channel and a common channel as well as the structure for receiving a multicast message and transmitting a transmission power increase request signal to the base station.

When the multicast message communicating system uses the CDMA system, the same spread code is designated to the base station and the plurality of mobile stations. With the spread code, the base station spreads a transmission signal with the spread code. Each of the mobile stations despreads a reception signal with the spread code. Thus, a multicast message transmitted from the base station is received by the plurality of specific mobile stations at the same time.

Table 1 shows signals exchanged between the base station and the plurality of mobile station of the multicast message communicating system. For example, from the base station to the plurality of mobile station, there are (a) the multicast message, (b)the transmission power increase request power and (c)the transmission power decrease request signal. Further, from the plurality of mobile stations to the base station, there is (a) the transmission power increase request signal.

|  | to base station | to the plurality of mobile stations |
|---|---|---|
| from base station | . . . | (a)Multicast Message, (b)Transmission power increase request signal, (c)Transmission power decrease request signal, |
| from plurality of mobile stations | (a)transmission power increase request signal | . . . |

FIG. 2 is a block diagram showing the structure of the demodulating device 13 of the base station. Reception signals Rx such as transmission power increase request signals transmitted from a plurality of mobile stations are supplied to an input selecting circuit 41. The selected input signals are input to a rake finger receiving portion 42. In addition, the selected input signals are supplied to a path searching circuit 43. The path searching circuit 43 estimates a delay profile of the multi-path. A multiplexing device 44 multiplexes a long code assigned to each mobile station by a short code assigned to each channel and generates a spread code. In each of rake finger circuits #1 to #8, a delaying circuit 422 delays the spread code corresponding to the delay profile. A dispreading circuit 421 despreads the signal received from the input selecting circuit 41. A pilot symbol of the despread signal is input to a transmission path estimating circuit 423. The transmission path estimating circuit 423 estimates a transmission path characteristic of the despread signal. With the estimation coefficient, a synchronous detecting circuit 424 performs a synchronous detecting process for the despread signal. An output signal of the synchronous detecting circuit 424 is supplied to a maximum ratio combining circuit 45. The maximum ratio combining circuit 45 combines all output signals of the synchronous detecting circuits 424 of the rake finger circuits #1 to #8.

It should be noted that the structure shown in FIG. 2 is just an example. Thus, the demodulating device of the base station according to the present invention is not limited to the structure shown in FIG. 2.

Thereafter, as shown in FIG. 1A, in the base station, the modulating device 12 modulate a multicast message and transmits the modulated multicast message from the antenna 10 through the circulator 11. A signal received from a mobile station is supplied to the demodulating device 13 through the antenna 10 and the circulator 11. The power detecting portion 14 detects the reception power of the transmission power increase request signal received from the mobile station. The reception power may be measured by calculating the average of reception powers of a predetermined number of symbols. With signals supplied from the power detecting portion 14 and the timer 15, the transmission power controlling portion 16 controls the transmission power as follows.

(1) When the reception power of the transmission power increase request signal received from each of the plurality of mobile stations exceeds a second threshold value (as denoted by B in FIGS. 4A and 4B), the transmission power controlling portion 16 increases the transmission power of the multicast message.

(2) When the reception power of the transmission power increase request signal received from each of the plurality of the mobile stations is equal to or smaller than the second threshold value and this state continues for a predetermined time period, the transmission power controlling portion 16 decreases the transmission power of the multicast message.

(3) When the conditions (1) and (2) are not satisfied, the transmission power controlling portion 16 does not vary the transmission power of the multicast message.

When the reception power of the transmission power increase request signal received from each of the plurality of the mobile stations exceed a first threshold value (that is denoted by A in FIGS. 4A and 4B and that is designated by the transmission power controlling device 16; the first threshold value is different from the second threshold value), the transmission power control (TPC) signal generating device 17 generates a transmission power decrease request signal that causes the transmission power of each mobile station to be decreased and supplies the transmission power decrease request signal to the modulating device 12. When the reception power of the transmission power increase request signal received from each of the plurality of mobile stations is equal to or smaller than the first threshold value, the transmission power control signal generating device 17 generates a transmission power increase request signal that causes the transmission power of each mobile station to be increased and supplies the transmission power increase request signal to the modulating device 12. The modulating device 12 modulates the transmission power increase request signal or the transmission power decrease request signal with the multicast message and transmits the modulated signal to each mobile station.

Among signals transmitted from the base station to the mobile stations, the transmission power increase request signal or the transmission power decrease request signal are always transmitted in a predetermined level (that allows these signals to be transmitted to the farthest mobile station in the service range of the cell with sufficient quality).

On the other hand, in each mobile station, a signal received from the base station is supplied to the demodulating device 23 through the antenna 20 and circulator 21. The demodualtor 23 demodualtes the signal and obtains a multicast message and a transmission power increase request signal or a transmission power decrease request signal. The power detecting portion 24 detects the reception power of the multicast message. The transmission power control (TPC) signal detecting device 25 detects the transmission power increase request signal or the transmission power decrease request signal received from the base station.

With the detected results, the transmission power controlling device 26 of each mobile station controls the transmission power of the transmission power increase request signal to be transmitted to the base station as follows.

(1) When the reception power of the multicast message received from the base station is equal to or smaller than a fourth threshold value (with which each mobile station receives the multicast message with a sufficient quality) and the transmission power control signal received from the base station is a transmission power increase request signal, the transmission power controlling device 26 increases the transmission power.

(2) When the reception power of the multicast message received from the base station is equal to or smaller than the fourth threshold value and the transmission power control signal received from the base station is a transmission power decrease request signal, the transmission power controlling device 26 decreases the transmission power.

(3) When the reception power of the multicast message received from the base station is larger than the forth threshold value, the transmission power controlling device 26 gradually decreases the transmission power. In this case, the transmission power controlling device 26 ignores the transmission power increase request signal or the transmission power decrease request signal received from the base station. In addition, it should be noted that the transmission power controlling device 26 does not always decrease the transmission power corresponding to the method (2).

The modulating device 22 modulates the transmission power increase request signal of the mobile station and transmits the modulated signal to the base station through the circulator 21 and the antenna 20.

Figure 4A:
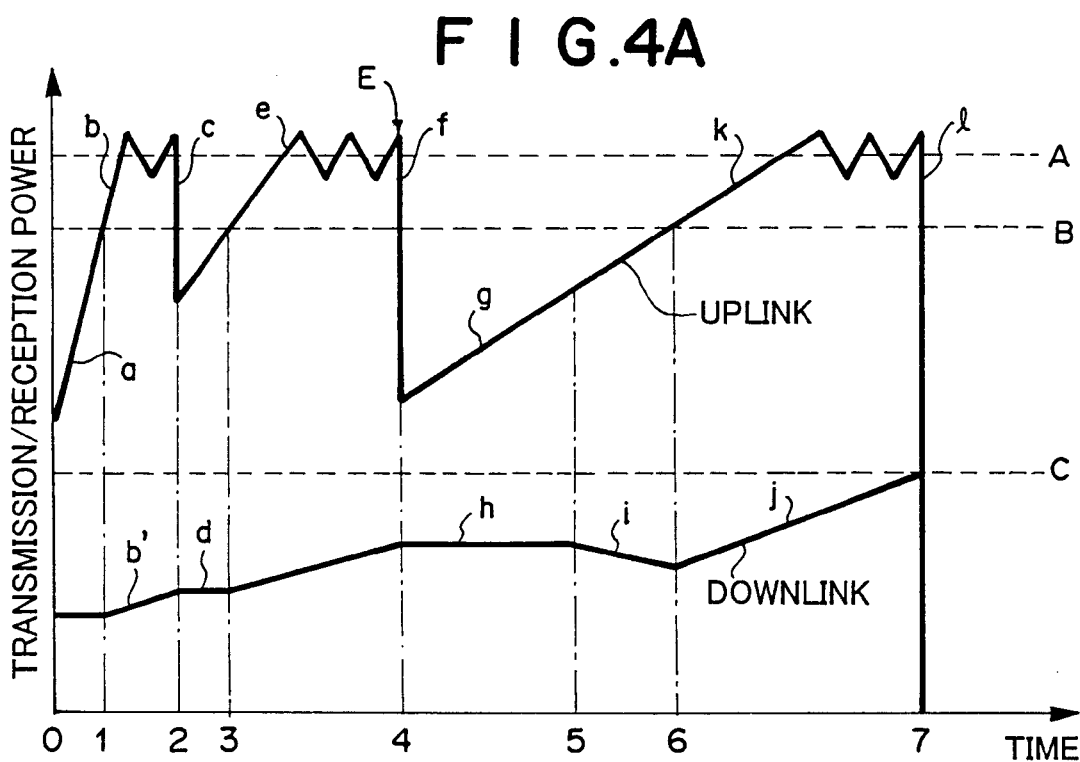
FIGS. 4A and 4B are time charts showing a controlling process for a transmission power and a reception power in the base station of the mobile communicating system according to the present invention.
Figure 4B:
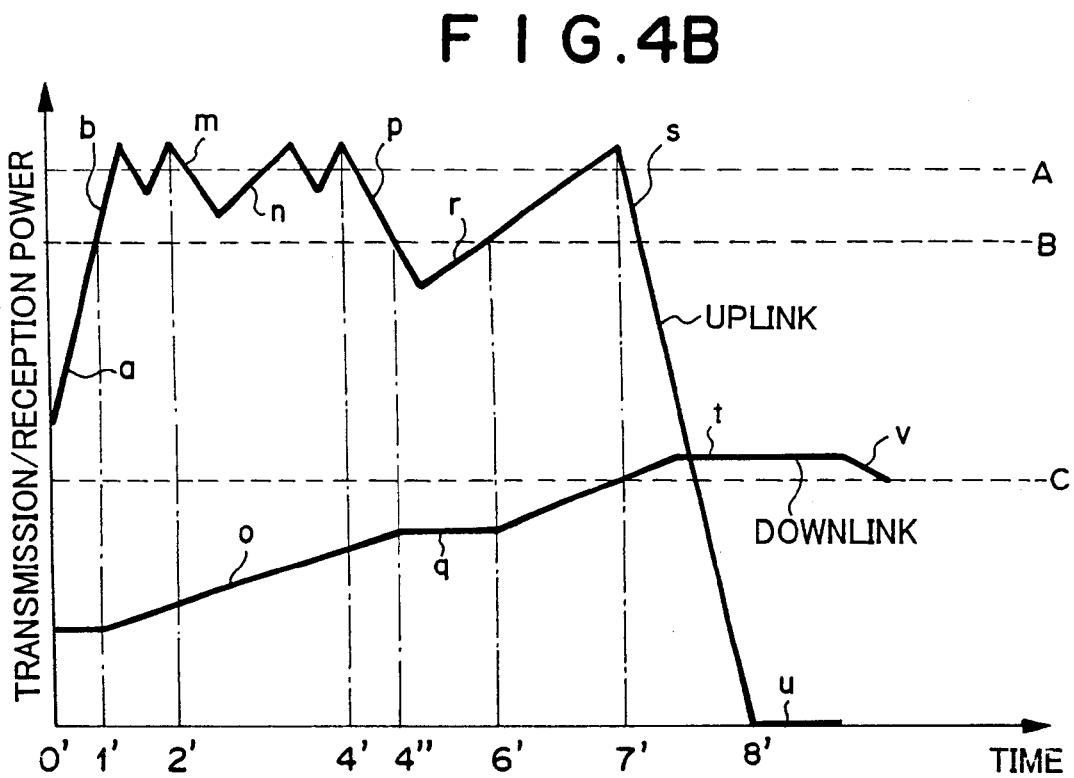

In the base station and each mobile station, the antennas 10 and 20 are directly driven by the modulating devices 12 and 22 through the circulators 11 and 21, respectively. When the multicast message communicating system uses the CDMA system, the modulating devices 12 and 22 spread-modulate the transmission power increase request signals with a PN signal and converts the modulated signals into predetermined radio frequency signals. The power amplifying portions amplify the radio frequency signals and supply the amplified signals to the antennas 10 and 20. In FIG. 4A, a signal is directly input from the circulator 11 to the demodulating device 13. In reality, the demodulating device 13 converts a radio frequency signal received from each mobile station into an intermediate frequency signal, de-spreads the intermediate signal with the PN signal, and converts the intermediate signal into a base band signal. The base band signal as a transmission power increase request signal received from each mobile station is supplied to the power measuring device 14. The power measuring device 14 detects the reception power. In FIG. 4B, in each mobile station, a signal is directly input from the circulator 21 to the demodulating device 23. In reality, the demodulating device 23 converts a received radio frequency signal into an intermediate frequency signal, despreads the intermediate frequency signal with the PN signal, converts the resultant signal into a base band signal. The multicast message and the transmission power control signal received from the base station are output. In addition, the base band signal is input to the power detecting portion 24. The power detecting portion 24 detects the reception power.

As the communicating method of the mobile communicating system, the present invention can be applied to IMT-2000 and cdmaOne using the CDMA (Code Division Multiple Access) method and PDC (Personal Digital Cellular) and PHS (Personal handyphone System) using the TDMA (Time Division Multiple Access) method.

(2) Description of Operation

FIG. 3 shows an example of the structure of the multicast message transmitting system according to the present invention. A base station 30 shown in FIG. 1A and mobile stations 31 to 35 shown in FIG. 1B are disposed in one cell 38 denoted by a dotted line. The base station 30 transmits a multicast message to the mobile stations 31 to 35 using a multicast channel. The area 36 denoted by a dotted line is a high quality communication area in which the mobile stations can receive a multicast message with sufficient quality at a particular time. An extended area 37 denoted by a solid line is an extended high quality communication area in the case that the transmission power of the base station is increased by one level. An area 38 is a boundary of the cell of which the base station 30 covers. Thus, the area 37 is always present inside the area 38. The outside of the area 38 is adjacent to a cell of another base station.

With the transmission power increase request signal received from a mobile station, the transmission power of a signal transmitted from the base station to the mobile stations is increased. When the area 36 for the high quality communication area for the multicast message is extended to the area 37, mobile stations 33 and 34 are covered by the base station 30. When the area is extended, the mobile stations 33 and 34 do not need to transmit the transmission power increase request signals to the base station 30. Thus, the mobile stations 33 and 34 can stop transmitting the transmission power increase request signals to the base station 30. However, according to the present invention, the mobile stations 33 and 34 do not abruptly decrease the transmission powers of the transmission power increase request signals to 0. Instead, the mobile stations 33 and 34 gradually decrease the transmission powers. In addition, at this point, since the reception quality of the signal received by the mobile station 35 is not sufficient, the mobile station 35 continuously transmits the transmission power increase request signal to the base station 30. Corresponding to the transmission power increase request signal, the base station 30 further increases the transmission power.

Next, an example of a transition of the transmission power (downlink) of a signal transmitted from the base station to mobile stations and an example of a transition of the reception, power (uplink) of a transmission power increase request signal will be described for the cases corresponding to the present invention (see FIG. 4B) and the related art reference disclosed as Japanese Patent Application No. 10-310048 (Laid-Open Publication No. 2000-138632)(see FIG. 4A).

In FIGS. 4A and 4B, the horizontal axis and the vertical axis represent time axis and transmission/reception powers, respectively. In FIGS. 4A and 4B, an uplink represents a transition of the reception power of the transmission power increase request signal received by the base station, whereas a downlink represents a transition of the transmission power of the multicast message transmitted from the base station to each mobile station. In FIGS. 4A and 4B, three dotted lines A, B, and C represent the following values.

Line (A) represents a first threshold value with which it is determined whether the transmission power control signal transmitted from the base station to each mobile station is a transmission power increase request signal or a transmission power decrease request signal.

Line (B) represents a second threshold value with which it is determined whether or not the base station increases the transmission power of the multicast message.

Line (C) represents a third threshold value with which it is determined whether a mobile station whose reception condition is the worst in the cell can receive the multicast message with a sufficient quality (namely, the optimum value of the transmission power of the base station at the point).

Normally, the relation of A>B is satisfied. However, the relations and spaces of these lines do not relate to the present invention.

First of all, the conventional method shown in FIG. 4A will be described. In FIG. 4A, at time 0, since the reception power of the transmission power increase request signal received from a mobile station is smaller than the second threshold value B (as denoted by line a), the base station transmits the transmission power increase request signal to the mobile station as the down link. Thus, the reception power of the base station increases. At time 1, the reception power of the transmission power increase request signal received from the mobile station exceeds the second threshold value b (as denoted by line b). Thus, the transmission power of the multicast message and so forth transmitted from the base station to the mobile station starts increasing (as denoted by line b At time 2, the reception power of a particular one of the plurality of mobile stations becomes sufficient. In this case, the particular mobile station does not need to cause the base station to increase the transmission power. Thus, the particular mobile station stops transmitting the transmission power increase request signal (as denoted by line c). In other words, the particular mobile station decreases the transmission power of the transmission power increase request signal to 0. Thus, at time 2, since the transmission power of the particular mobile station is 0, the reception power of the transmission power increase request signal received by the base station abruptly decreases.

In the multicast message communicating system, the transmission power increase request signal is transmitted from each mobile station using a common channel of the cell. Thus, at time 2, the reception power of the transmission power increase request signal received by the base station decreases. Normally, it is considered that the decrease amount is larger than the difference between the first threshold value A and the second threshold value B. Thus, the transmission power of the multicast message transmitted from the base station does not increase (as denoted by line d). The transmission power of the multicast message transmitted from the base station does not vary until the reception power of the transmission power increase request signal exceeds the second threshold value B at time 3. Corresponding to the transmission power increase request signal transmitted from the base station, each mobile station gradually increases the transmission power of the transmission power increase request signal to be transmitted to the base station (as denoted by line e).

When the reception powers of the plurality of mobile stations become sufficient levels at the same time (as denoted by point E), the reception powers of the transmission power increase request signals received from the mobile stations largely decrease at time 4 (as denoted by line f). In this case, the base station transmits the transmission power increase request signal to the mobile stations so as to increase the transmission powers of the mobile stations (as denoted by line g). It takes a long time until the reception power of the base station becomes the second threshold value B. Since the transmission powers of the transmission power increase request signals transmitted from the mobile stations are equal to or less than the second threshold value B, the base station keeps the transmission power of the downlink to a predetermined level (as denoted by line h). When the base station does not receive the transmission power increase request signals from the mobile stations for a predetermined time period, the base station gradually decreases the transmission power of the downlink (as denoted by line i). Thus, even if some mobile stations do not have sufficient reception powers, the transmission power of the base station decreases at time 5 to time 6.

After time 6, corresponding to the transmission power increase request signals received from the mobile stations, as shown in FIG. 4A, the base station gradually increases the transmission power of the multicast message as the downlink to the mobile stations (as denoted by line j). In addition, the base station transmits the transmission power increase request signal to the mobile stations so that they increase the transmission powers of the transmission power increase request signals to be transmitted to the base station. Thus, as shown in FIG. 4A, the base station gradually increases the detection levels of the reception powers of the transmission power increase request signals received as the uplink from the mobile stations (as denoted by line k).

Thus, at time 7, the reception powers of all the mobile stations become sufficient levels and all the mobile stations stop transmitting the transmission power increase request signals (as denoted by line l). After time 7, since each mobile station can receive the multicast message with high quality, it does not need to transmit the transmission power increase request signal to the base station. Thus, the reception power of the base station is kept to 0. The base station keeps the transmission power of the downlink for a predetermined time period.

Next, in the same situation as FIG. 4A, transitions of transmission powers of the uplink and the downlink according to the present invention will be described with reference to FIG. 4B. The transition from time 0 to time 2 shown in FIG. 4B is the same as that shown in FIG. 4A. At time 2 when the reception power of a mobile station becomes a sufficient level, the mobile station does not abruptly decrease the transmission power of the transmission power increase request signal to 0, but gradually decreases it (as denoted by line m). Thus, since other mobile stations gradually increase the transmission powers of the transmission power increase request signals to be transmitted to the base station, before the reception power of the uplink starts becomes smaller than the second threshold value, the reception power increases again (as denoted by line n). Thus, time 4' of which the reception powers of two or more mobile stations become sufficient is earlier than time 4 shown in FIG. 4A. On the other hand, since the reception powers of the transmission power increase request signals transmitted to the base station are not smaller than the second threshold value B, the transmission power of the downlink transmitted from the base station to the mobile stations gradually increase (as denoted by line o).

After time 4, since the two or more mobile stations gradually decrease the transmission powers of the transmission power increase request signals to be transmitted to the base station (as denoted by line p), the period of time 4 to 6 shown in FIG. 4A (in this period, the reception power of the base station is equal to or smaller than the second threshold value) is shortened to the period from time 4 to 6 shown in FIG. 4B. Thus, unlike with the case shown in FIG. 4A, the transmission power of the base station can be prevented from decreasing. After time 4 since the reception powers of the transmission power increase request signals transmitted from the mobile stations to the base station become equal to or smaller than the second threshold value B, the transmission power of the multicast message as the downlink transmitted from the base station to the mobile stations is kept in a predetermined level (as denoted by line q). Since a mobile station that cannot receive the multicast message with sufficient quality gradually increases the transmission power of the transmission power increase request signal to be transmitted to the base station, up to time 7 the reception powers of the transmission power increase request signals received from the mobile station are represented as an intersection of line p and line r of which a mobile station gradually decreases the transmission power of the transmission power increase request signal and a mobile station gradually increases the transmission power of the mobile power increase request, respectively.

At time 7 the reception powers of all the mobile stations become sufficient levels in a shorter time period than the case shown in FIG. 4A. In other words, time 7 shown in FIG. 4B is earlier than time 7 shown in FIG. 4A. After time 8 the transmission powers of all the mobile stations become 0. After that, since each mobile station can receive the multicast message as a reception signal with high quality, each mobile station does not need to transmit the transmission power increase request signal to the base station. Thus, the reception power of the base station is kept to 0 (as denoted by line u). In addition, the transmission powers of the transmission power increase request signals transmitted from the mobile stations to the base station decrease (as denoted by line s). When the transmission powers of the transmission power increase request signals become equal to or smaller than the second threshold value B, the base station keeps the transmission power of the downlink such as the multicast message (as denoted by line t). Thus, the base station stops increasing the transmission power of the downlink. Thereafter, since the mobile stations do not transmit the transmission power increase request signals to the base station, after a predetermined time period, the base station decreases the transmission power of the downlink (as denoted by line v).

In both the cases shown in FIGS. 4A and 4B, when a mobile station is behind a building (shadowing) or a fading phenomenon of which the reception level abruptly decreases takes place after time 7 or time 7' since the reception quality of the mobile station deteriorates, the mobile station transmits the transmission power increase request signal to the base station so as to restart the above-described operation.

Figure 5A:
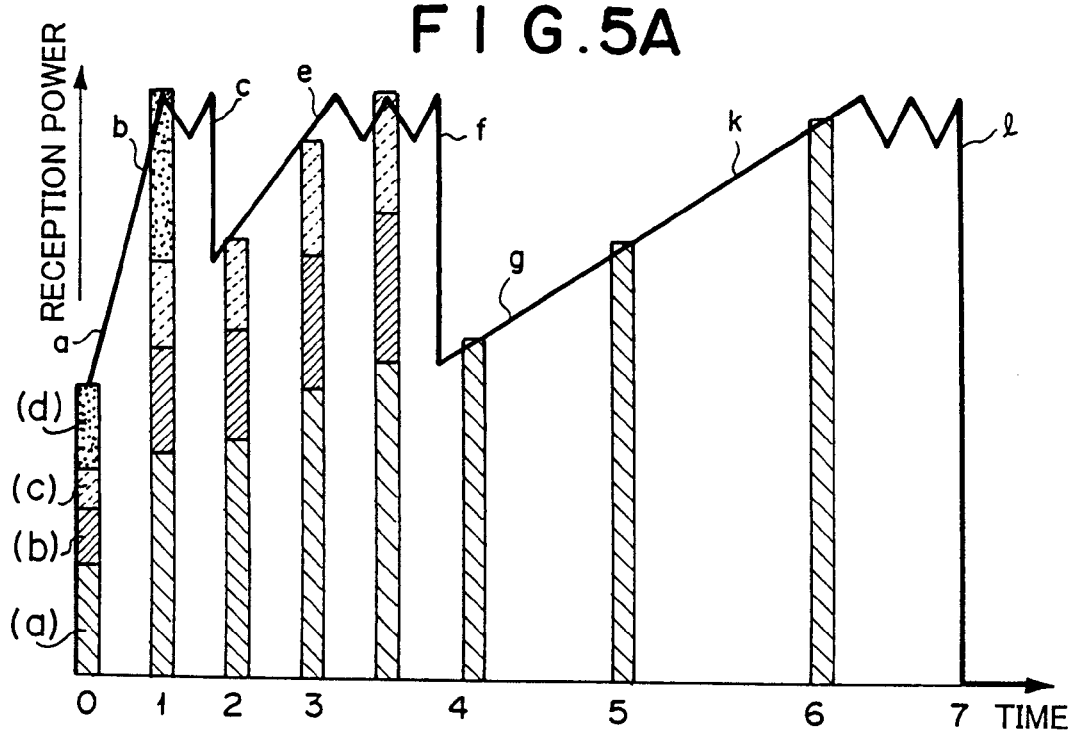
FIGS. 5A and 5B are time charts showing a controlling process of the reception power of the base station of the mobile communicating system according to the present invention.
Figure 5B:
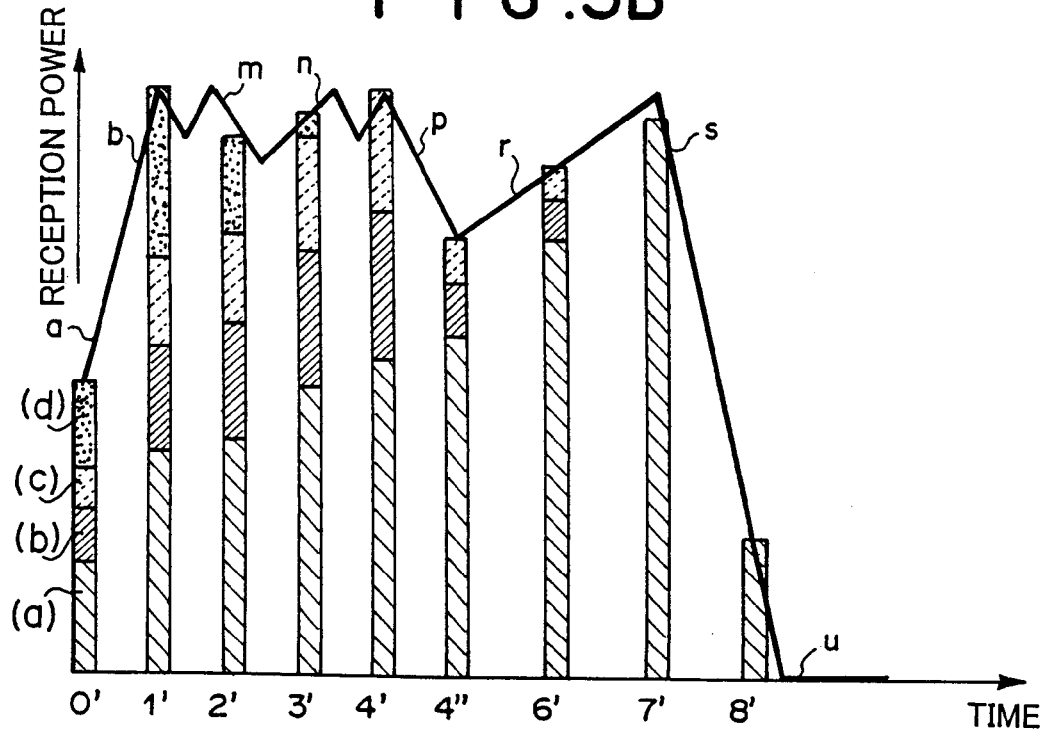

Next, the examples shown in FIGS. 4A and 4B will be described in detail with reference to FIGS. 5A and 5B, respectively. In FIGS. 5A and 5B, four mobile stations (a) to (d) are considered. FIG. 5A shows an example of the conventional method corresponding to FIG. 4A. FIG. 5B shows an example of the present invention corresponding to FIG. 4B.

In FIG. 5A, at time 0, the base station starts transmitting a multicast message to the base stations (a) to (d). At this point, the four mobile stations (a), (b), (c), and (d) transmit transmission power increase request signals with low powers to the base station (as denoted by line a). At time 1, the four mobile stations transmit the transmission power increase request signals with higher transmission powers than those at time 0 (as denoted by line b). At time 2, since the fourth mobile station d has a sufficient reception power, the mobile station d stops transmitting the transmission power increase request signal to the base station (as denoted by line c). Thus, the reception power of the base station at time 2 largely decreases in comparison with that at time 1. From time 3 to time 4, the mobile stations (a) to (c) increase the transmission powers of the transmission power increase request signals to be transmitted to the base station (as denoted by line e). At time 4, since the mobile stations (b) and (c) have sufficient reception powers, they stop transmitting the transmission power increase request signals to the base station (thus, the transmission powers of the transmission power increase request signals are 0) (as denoted by line f).

At time 5, only the mobile station (a) increases the transmission power of the transmission power increase request signal to be transmitted to the base station (as denoted by line g). Until time 6, only the mobile station (a) increases the transmission power of the transmission power increase request signal to be transmitted to the base station (as denoted by line k). Thereafter, at time 7, since the mobile station (a) has a sufficient reception power, the mobile station (a) stops transmitting the transmission power increase request signal to the base station (as denoted by line 1). In this state, all the four mobile stations receive the multicast message with sufficient quality.

FIG. 5B shows the relation between reception powers and time points of the base station of the transmission power controlling method according to the present invention.

Time 0 and time 1 shown in FIG. 5B are the same as time 0 and time 1 shown in FIG. 5A (as denoted by lines a and b), respectively. At time 2 the mobile station (d) can receive a multicast message with sufficient quality from the base station. At this point, the mobile station (d) gradually decreases the transmission power of the transmission power increase request signal, not abruptly stops transmitting the transmission power increase request signal (as denoted by line m). At time 3 the mobile station (d) gradually decreases the transmission power. At time 4 the mobile station d stops transmitting the signal. The mobile stations (b) and (c) receive the multicast message with sufficient quality from the base station. At time 4 and time 6, the mobile stations (b) and (c) gradually decrease the transmission power (as denoted by line p). As with the mobile stations (c) and (b) at time 4 and time 6, the mobile station (a) receives the multicast message with high quality at time 7 and time 8 Thus, the mobile station (a) gradually decreases the transmission power of the transmission power increase request signal to be transmitted to the base station (as denoted by line s). Thereafter, the base station cannot receive the transmission power increase request signals from the mobile stations. Thus, the mobile stations that receive the multicast message with high quality do not need to transmit the transmission power increase request signals to the base station (as denoted by line u).

Time 0 to time 7 shown in FIG. 4A correspond to time 0' to time 8 and time 4 Time 0 to time 7 shown in FIG. 5A correspond to time 0 to time 8' shown in FIG. 5B. However, time 0 to time 7 shown in FIG. 4A do not correspond to time 0 to time 7 shown in FIG. 5A. Time 0 to time 8 and time 4 shown in FIG. 4B correspond to time 0 to time 8' shown in FIG. 5B.

Figure 6:
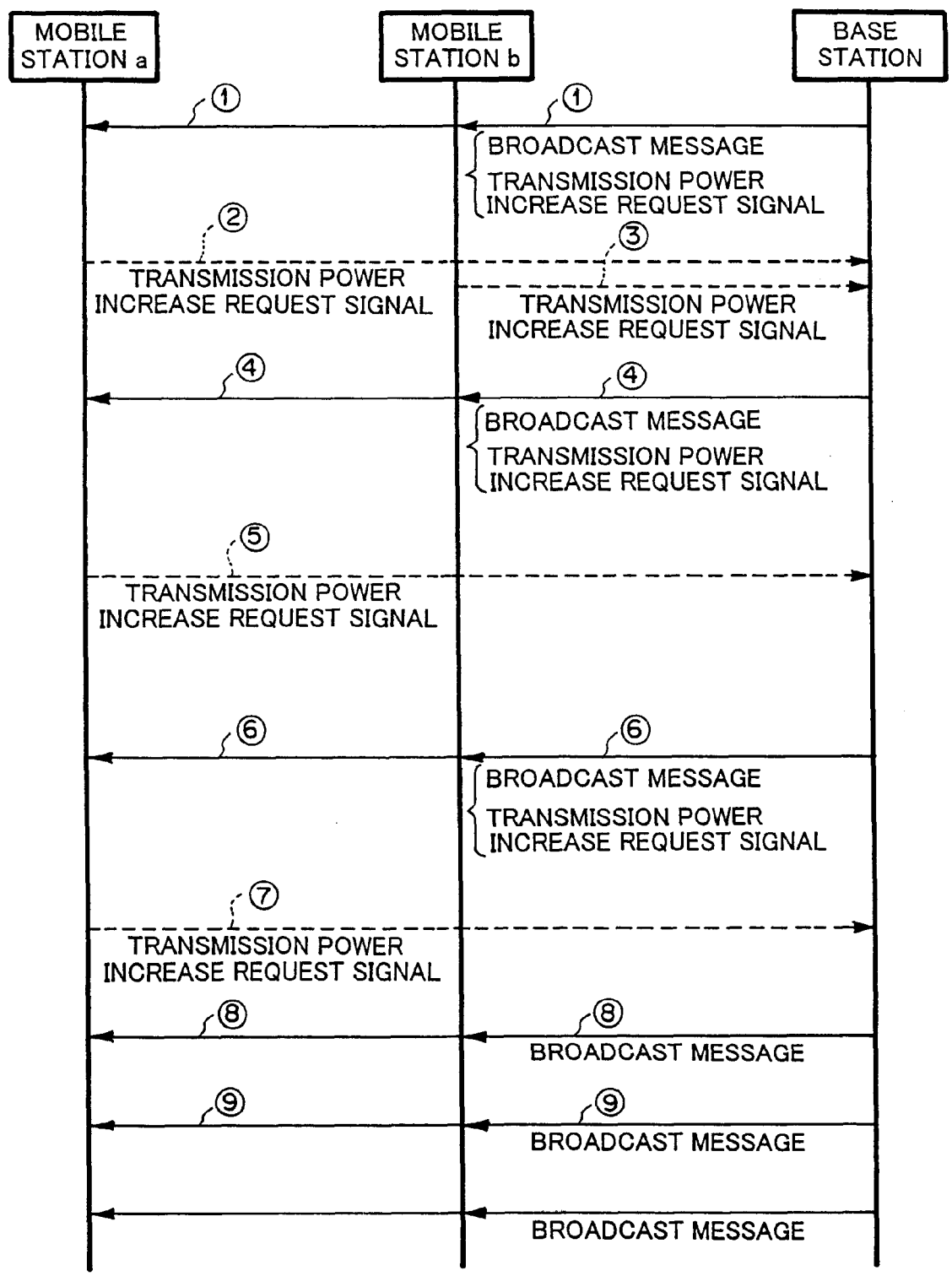
FIG. 6 is a sequence chart showing a process performed by a base station and two mobile stations of the mobile communication system according to the present invention.

FIG. 6 is a sequence chart showing a process of the system according to the present invention. In FIG. 6, it is assumed that a base station and mobile stations a and b are disposed in such a manner that the mobile station b is closer to the base station than the mobile station a. (1) The base station transmits a multicast message and a transmission power increase request signal to the mobile stations a and b. (2) The mobile station a transmits a transmission power increase request signal to the base station so that the base station increases the transmission power. (3) The mobile station b transmits a transmission power increase request signal to the base station so that the base station increases the transmission power. (4) The base station increases the transmission power of the multicast message and so forth and transmits the multicast message and so forth to the mobile stations a and b. Thereafter, since the mobile station b can receive the multicast message and so forth with sufficient reception quality from the base station, the mobile station b does not transmit the transmission power increase request signal to the base station. (5) The mobile station a transmits the transmission power increase request signal to the base station.

(6) The base station increases or keeps the transmission power of the multicast message and so forth and transmits them to the mobile stations. (7) Since the mobile station a can receive the multicast message and so forth with sufficient quality, the mobile station a gradually decreases the transmission power of the transmission power increase request signal and transmits it to the base station. Thereafter, the base station increases or keeps the transmission power of the multicast message and so forth and transmit them to the mobile stations. However, since the base station does not receive the transmission power increase request signals from the mobile stations for a predetermined time period, the base station recognizes that the mobile stations receive the multicast message and so forth with sufficient reception quality. (8)(9) The base station transmits the multicast message and so forth to the mobile stations. When the base station does not receive the transmission power increase request signals from the mobile stations for a predetermined time period, the base station decreases the transmission power of the multicast message and so forth and transmits them to the mobile stations.

As described above, since the mobile stations gradually decrease the transmission output levels of the transmission power increase request signals, the time period after the base station starts transmitting a multicast message until each mobile station stably receives the multicast message with sufficient reception quality can be decreased. Thus, the base station can transmit a multicast message with sufficient quality to a plurality of specific mobile stations.

In the case that each mobile station gradually decreases the transmission power of the transmission power increase request signal according to the embodiment, although the decrease of the transmission power depends on a transmission power decrease request signal transmitted from the base station, the mobile station can decrease the transmission power at a predetermined interval (such as 0.5 dB) or corresponding to a non-linear decrease curve.

Second Embodiment

Next, a second embodiment of the present invention will be described.

According to the second embodiment, in FIG. 1A, a power detecting portion 14 measures reception powers of transmission power increase request signals received from a plurality of mobile stations. When a TPC signal generating device 17 decides a transmission power control (TPC) bit signal, the TPC signal generating device 17 generates a large power increase request signal that causes each mobile station to largely increase the transmission power as well as a transmission power increase request signal and a transmission power decrease request signal. When the reception power of the base station is much smaller than the second threshold value (FIG. 4B), the base station transmits the large power increase request signal to each mobile station.

A TPC bit detecting device 25 of each mobile station has a function for detecting the large power increase request signal as well as the transmission power increase request signal and transmission power decrease request signal. When the TPC bit detecting device 25 detects the large transmission power increase request signal, a transmission power controlling portion 26 increases by a large increasing range the transmission power of the multicast message and so forth and transmits them to the base station. Thus, when the reception power of the base station abruptly decreases at time 2 and time 4 shown in FIG. 4A, the period (time 2 to time 3 and time 4 to time 6) of which the reception power becomes smaller than the second threshold value B is shortened. Consequently, the transmission power converges at high speed. In addition, the power consumption of each mobile station decreases.

It should be noted that the present invention can be applied to a combination of the first embodiment and the second embodiment. In this case, higher effects than those of each of the first embodiment and the second embodiment can be obtained.

In the first and second embodiments, the multicast message transmission power controlling system using the CDMA system was described. Unlike with a conventional multicast message of which a base station transmits the same message to all mobile stations in the service area thereof, As a multicast message according to the present invention, a message "Gather around all of you at xx o'clock" may be transmitted to all tour members. As another example, a multicast message may be transmitted to all members of a sales department who have portable terminals at predetermined intervals so that they can know the achievements of all members. In this case, sales activities can be aggressively promoted.

According to the present invention, the multicast message is not limited to a character message. For example, the multicast message may be audio data, picture data, and/or graphic data. In addition, the present invention can be applied to the case of a multicast message channel corresponding to the spread spectrum modulating system using time slots corresponding to the TDD-CDMA system because a response channel and a response slot corresponding to the time slot are predefined.

According to the present invention, as a first effect, when a multicast message is transmitted using a multicast channel, since a base station and each mobile station mutually perform a communication control, when a mobile station has a reception power with a sufficient level, it gradually decreases a transmission power. Thus, the period of which the reception power of the base station decreases can be shortened. Consequently, the time period of which the transmission power of the base station converges to an optimum value can be shortened.

As a second effect, the time period of which each mobile station receives a multicast message with sufficient quality can be shortened. Thus, the time period of which each mobile station transmits a transmission power increase request signal can be shortened. As a result, the power consumption of each mobile station can be reduced. Thus, the life of the battery of each mobile station can be prolonged.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A multicast message communicating system, comprising:
    a base station for transmitting a multicast message using a multicast channel; and
    a plurality of mobile stations for receiving the multicast message from said base station,
    wherein said base station has:
        a receiving portion for receiving transmission power increase request signals from said plurality of mobile stations corresponding to reception powers of the multicast message received by said plurality of mobile stations;
        a reception power detecting portion for detecting the reception powers of the transmission power increase request signals received from the receiving portion;
        transmission power control generating means for deciding and generating a transmission power increase request signal or a transmission power decrease request signal for said plurality of mobile stations corresponding to the received powers; and
        a power controlling portion for controlling the transmission power of the multicast message transmitted to said plurality of mobile stations corresponding to the reception powers,
    wherein the multicast message and the transmission power increase request signal or the transmission power decrease request signal are transmitted to said plurality of mobile stations, and
    wherein said plurality of mobile stations gradually decrease the transmission powers of the transmission power increase request signals corresponding to the reception powers of the transmission power increase request signal or the transmission power decrease request signal, and the multicast message received from said base station.

2. The multicast message communicating system as set forth in claim 1,
    wherein each of said plurality of mobile stations has:
        demodulating means for receiving the multicast message and demodulating it;
        reception power detecting means for detecting the reception power of the multicast message received by the demodulating means;
        transmission power increase/decrease request signal detecting means for detecting the transmission power increase request signal or the transmission power decrease request signal received from said base station; and
        transmission power controlling means for deciding the transmission power of the transmission power increase request signal to be transmitted to said base station,
        wherein when the demodulating means receives the multicast message with sufficient quality from said base station, the transmission power controlling means gradually decreases the transmission power of the transmission power increase request signal.

3. The multicast message communicating system as set forth in claim 1,
    wherein the power controlling portion of said base station increases the transmission power of the multicast message in condition (1) of which the reception power of the transmission power increase request signal received from each of said plurality of mobile stations exceeds a second threshold value,
    wherein the power controlling portion of said base station decreases the transmission power of the multicast message in condition (2) of which the reception power of the transmission power increase request signal received from each of said plurality of mobile stations is equal to or smaller than the second threshold value for a predetermined time period, and
    wherein the power controlling portion of said base station does not vary the transmission power of the multicast message in condition (3) of which the conditions (1) and (2) are not satisfied.

4. The multicast message communicating system as set forth in claim 1,
    wherein when the reception power of the multicast message received from each of said plurality of mobile stations is equal to or larger than a fourth threshold value, the transmission power of the transmission power increase request signal transmitted to said base station is gradually decreased.

5. The multicast message communicating system as set forth in claim 1,
    wherein said base station controls the transmission power of the multicast message corresponding to the reception power of the transmission power increase request signal received from each of said plurality of mobile stations.

6. The multicast message communicating system as set forth in claim 2,
    wherein the power controlling portion of said base station increases the transmission power of the multicast message in condition (1) of which the reception power of the transmission power increase request signal received from each of said plurality of mobile stations exceeds a second threshold value,
    wherein the power controlling portion of said base station decreases the transmission power of the multicast message in condition (2) of which the reception power of the transmission power increase request signal received from each of said plurality of mobile stations is equal to or smaller than the second threshold value for a predetermined time period, and
    wherein the power controlling portion of said base station does not vary the transmission power of the multicast message in condition (3) of which the conditions (1) and (2) are not satisfied.

7. The multicast message communicating system as set forth in claim 2,
    wherein when the reception power of the multicast message received from each of said plurality of mobile stations is equal to or larger than a fourth threshold value, the transmission power of the transmission power increase request signal transmitted to said base station is gradually decreased.

8. The multicast message communicating system as set forth in claim 2, wherein said base station controls the transmission power of the multicast message corresponding to the reception power of the transmission power increase request signal received from each of said plurality of mobile stations.

9. The multicast message communicating system as set forth in claim 3, wherein when the reception power of the multicast message received from each of said plurality of mobile stations is equal to or larger than a fourth threshold value, the transmission power of the transmission power increase request signal transmitted to said base station is gradually decreased.

10. The multicast message communicating system as set forth in claim 3, wherein said base station controls the transmission power of the multicast message corresponding to the reception power of the transmission power increase request signal received from each of said plurality of mobile stations.

11. A multicast message communicating method having a base station for transmitting a multicast message using a multicast channel and a plurality of mobile stations for receiving the multicast message from the base station, the method comprising the steps of:

(a) receiving transmission power increase request signals from the plurality of mobile stations corresponding to reception powers of the multicast message received by the plurality of mobile stations;

(b) detecting the reception powers of the transmission power increase request signals received from the receiving portion;

(c) deciding and generating a transmission power increase request signal or a transmission power decrease request signal for the plurality of mobile stations corresponding to the received powers; and (d) controlling the transmission power of the multicast message transmitted to the plurality of mobile stations corresponding to the reception powers, wherein the steps (a) to (d) are performed by the base station, wherein the multicast message and the transmission power increase request signal or the transmission power decrease request signal are transmitted to the plurality of mobile stations, and wherein the plurality of mobile stations gradually decrease the transmission powers of the transmission power increase request signals corresponding to the reception powers of the transmission power increase request signal or the transmission power decrease request signal, and the multicast message received from the base station.

12. The multicast message communicating method as set forth in claim 11, (e) receiving the multicast message and demodulating it;

(f) detecting the reception power of the multicast message received by the demodulating means;

(g) detecting the transmission power increase request signal or the transmission power decrease request signal received from the base station; and (h) deciding the transmission power of the transmission power increase request signal to be transmitted to the base station, wherein the steps (e) to (h) are performed by each of the plurality of mobile stations.

13. The multicast message communicating method as set forth in claim 11, wherein when the reception power of the multicast message received from each of the plurality of mobile stations is equal to or larger than a fourth threshold value, the transmission power of the transmission power increase request signal transmitted to the base station is gradually decreased.

14. The multicast message communicating method as set forth in claim 12, wherein when the reception power of the multicast message received from each of the plurality of mobile stations is equal to or larger than a fourth threshold value, the transmission power of the transmission power increase request signal transmitted to the base station is gradually decreased.

15. A base station for transmitting a multicast message to a plurality of mobile stations using a multicast channel, comprising:

a receiving portion for receiving transmission power increase request signals from the plurality of mobile stations corresponding to reception powers of the multicast message received by the plurality of mobile stations;

a reception power detecting portion for detecting the reception powers of the transmission power increase request signals received from said receiving portion;

transmission power control generating means for deciding and generating a transmission power increase request signal or a transmission power decrease request signal for the plurality of mobile stations corresponding to the received powers; and a power controlling portion for controlling the transmission power of the multicast message transmitted to the plurality of mobile stations corresponding to the reception powers, wherein the multicast message and the transmission power increase request signal or the transmission power decrease request signal cause the transmission powers of the plurality of mobile stations to be increased or decreased, and wherein the plurality of mobile stations gradually decrease the transmission powers of the transmission power increase request signals corresponding to the reception powers of the transmission power increase request signal or the transmission power decrease request signal, and the multicast message received from the base station.

16. The base station for transmitting a multicast message to a plurality of mobile stations using the multicast channel as set forth in claim 15, wherein when the mobile station receives the multicast message with sufficient quality from said base station, a transmission power controlling means of the mobile station gradually decreases the transmission power of the transmission power increase request signal from the mobile station.

17. The base station for transmitting a multicast message to a plurality of mobile stations using the multicast channel as set forth in claim 15, wherein the power controlling portion of the base station increases the transmission power of the multicast message in condition (1) of which the reception power of the transmission power increase request signal received from each of said plurality of mobile stations exceeds a second threshold value, wherein the power controlling portion of said base station decreases the transmission power of the multicast message in condition (2) of which the reception power of the transmission power increase request signal received from each of said plurality of mobile stations is equal to or smaller than the second threshold value for a predetermined time period, and wherein the power controlling portion of said base station does not vary the transmission power of the multicast message in condition (3) of which the conditions (1) and (2) are not satisfied.

18. A mobile station for receiving a multicast message from a base station using a multicast channel, comprising:

a receiving portion for receiving the multicast message and a transmission power increase request signal or a transmission power decrease request from the base station;

a reception power detecting portion for detecting the reception power of the multicast message received from said receiving portion; and a power controlling portion for comparing the reception power with a predetermined threshold value, stopping transmitting the transmission power increase request signal to the base station when the reception power is larger than the predetermined threshold value, and increasing the transmission power of the transmission power increase request signal when the reception power is equal to or smaller than the predetermined threshold value and said receiving portion receives the transmission power decrease request signal, wherein when said power controlling portion stops transmitting the transmission power increase request signal to the base station, said power controlling portion gradually decreases the transmission power thereof.

19. The mobile station for receiving the multicast message from the base station using a multicast channel, as set forth in claim 18, wherein when the mobile station receives the multicast message with sufficient quality from said base station, a transmission power controlling means of the mobile station gradually decreases the transmission power of the transmission power increase request signal from the mobile station.

20. The mobile station for receiving the multicast message from a base station using the multicast channel, as set forth in claim 18, wherein the power controlling portion of the base station increases a transmission power of the multicast message in condition (1) of which the reception power of the transmission power increase request signal received from each of said plurality of mobile stations exceeds a second threshold value, wherein the power controlling portion of said base station decreases the transmission power of the multicast message in condition (2) of which the reception power of the transmission power increase request signal received from each of said plurality of mobile stations is equal to or smaller than the second threshold value for a predetermined time period, and wherein the power controlling portion of said base station does not vary the transmission power of the multicast message in condition (3) of which the conditions (1) and (2) are not satisfied.

* * * * *